United States Patent [19]

Scobie et al.

[11] Patent Number: 4,846,212
[45] Date of Patent: Jul. 11, 1989

[54] BLEED VALVE ASSEMBLY FOR DOUBLE BLOCK AND BLEED SYSTEM

[75] Inventors: William B. Scobie, Houston; Daniel P. Kusmer, Stafford, both of Tex.

[73] Assignee: Keystone International, Inc., Houston, Tex.

[21] Appl. No.: 246,316

[22] Filed: Sep. 19, 1988

[51] Int. Cl.4 .......................... B08B 3/02; B08B 9/02; F16K 1/22
[52] U.S. Cl. ............................... 137/240; 134/167 C; 137/312; 137/597; 137/613; 251/306
[58] Field of Search ........... 134/166 R, 166 C, 167 R, 134/167 C, 172; 137/238, 240, 312, 613, 597, 625.31, 625.34, 625.4, 637.1; 251/305, 306

[56] References Cited

U.S. PATENT DOCUMENTS

| | | | |
|---|---|---|---|
| 1,332,000 | 2/1920 | Pfau | 137/312 |
| 2,038,132 | 4/1936 | Robinson et al. | 137/312 |
| 3,528,447 | 9/1970 | Kolb | 137/240 |
| 3,581,996 | 6/1971 | Boyer | 137/625.32 |
| 3,744,319 | 7/1973 | Harmes, III | 137/240 |
| 4,067,352 | 1/1978 | Halpine | 137/312 |
| 4,108,199 | 8/1978 | Bonafons | 137/312 |
| 4,373,545 | 2/1983 | Knappe | 137/240 |
| 4,458,706 | 7/1984 | Scholes | 137/240 |

FOREIGN PATENT DOCUMENTS 2064730 6/1981 United Kingdom ................ 137/312

Primary Examiner—George L. Walton
Attorney, Agent, or Firm—Browning, Bushman, Zamecki & Anderson

[57] ABSTRACT

A bleed valve assembly for use in a double block and bleed valve system having first and second block valves comprising a body which is disposed between the block valves which forms a chamber, a flowway having a generally smooth flowway surface defined by the body and partially defining the chamber, the body having a cavity which is in open communication with the chamber and a drain outlet in open communication with the cavity, there being disposed a valve assembly in the cavity which has a rotatable valve element which can be moved between a first open position permitting flow through the drain outlet and a second closed position preventing flow through the drain outlet, the valve assembly having a portion which partially defines the flowway surface when the valve element is in the second or closed position.

20 Claims, 5 Drawing Sheets

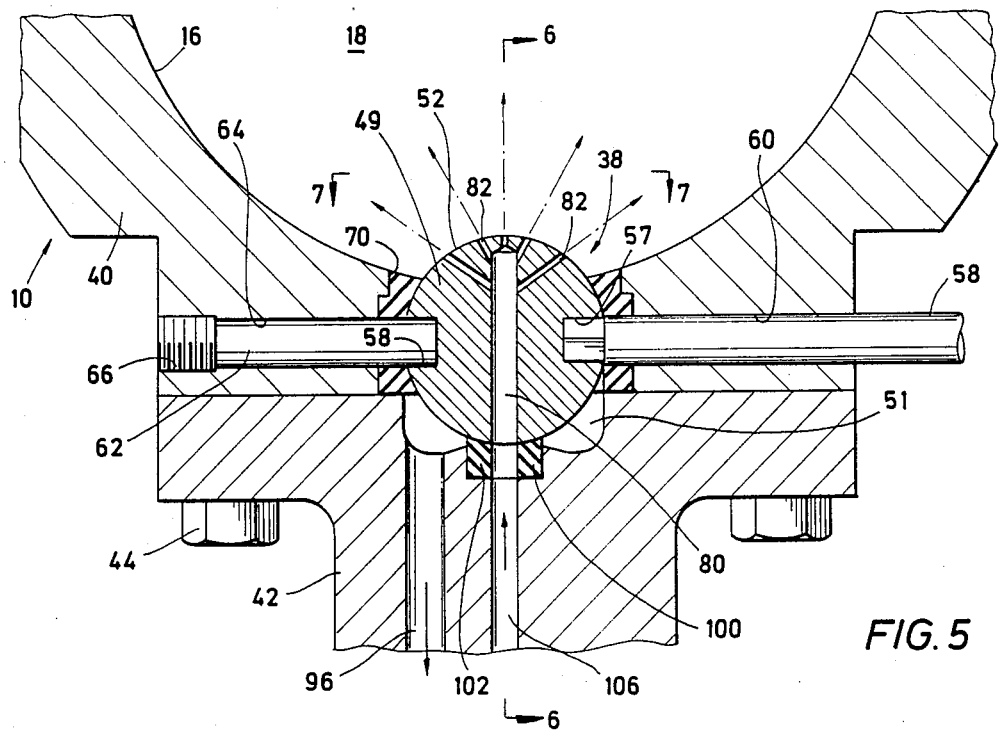
FIG. 5
FIG. 6
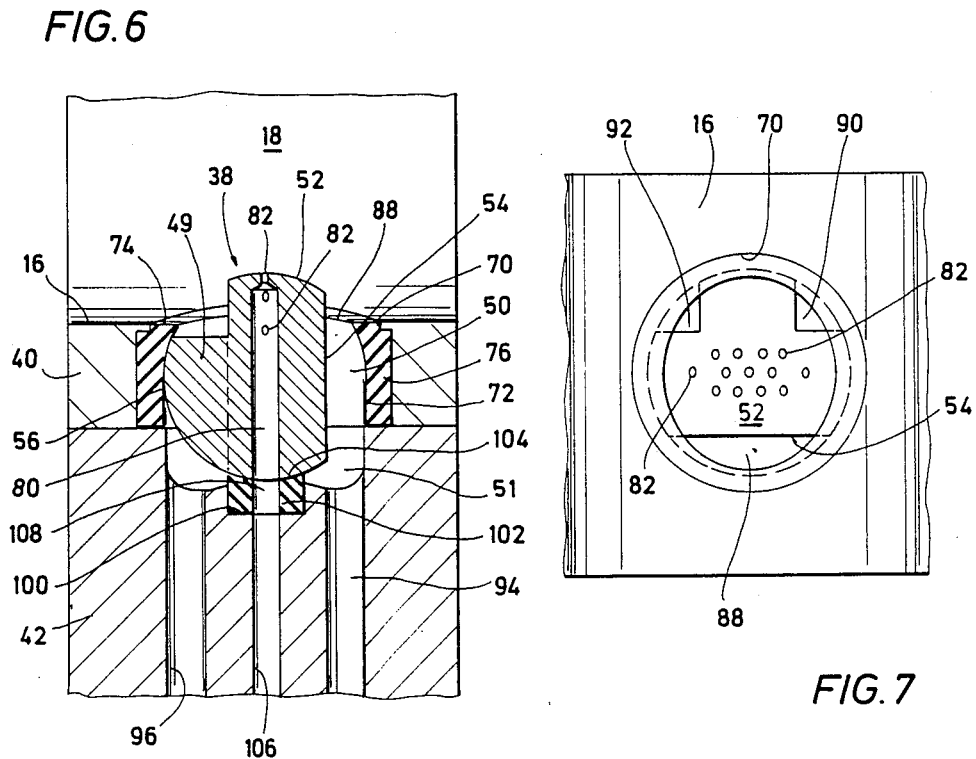
FIG. 7

BLEED VALVE ASSEMBLY FOR DOUBLE BLOCK AND BLEED SYSTEM

BACKGROUND OF THE INVENTION

1. Field of the Invention

The present invention relates to double block and bleed valve systems and, more particularly, to a bleed valve assembly for use in such a system.

2. Description of the Background

In industries which produce liquid products, particularly beverage industries, such as breweries, soft drink bottlers, dairies, etc., large networks of pipes are used to transfer liquid from one place to another. In these networks of pipes, the problem of contamination is an ever present risk. Accordingly, it is essential to provide means for internal cleaning of the pipe work at regular intervals. It will be recognized that because of the complexity of the pipe networks, any attempts to try cleaning by dismantling the networks is time consuming, expensive, and will result in significant downtime of the facility.

To overcome some of the cleaning problems associated with complex networks of pipes, valve isolating systems are employed. Such valve isolating systems, in and of themselves, present a problem inasmuch as there are normally dead spaces in the vicinity of the valve which cannot be readily cleaned because of their inaccessibility. Moreover, many such valve isolating systems do not provide any protection against leakage of cleaning fluids from one part of the pipe work on one side of the valve isolation system to another part on the other side which still contains liquid food material which, as a result, could become seriously contaminated.

In U.S. Pat. No. 4,458,706, there is disclosed a double block and bleed valve system which utilizes three butterfly valves in a T-network, two of the butterfly valves serving as the double block valves, the third butterfly valve serving as a drain valve for the chamber formed between the two block valves. The system further includes a so-called "clean-in-place" feature which comprises a spray head which is disposed in the chamber through which can be introduced a cleaning fluid such that the chamber can be thoroughly cleaned and the spent cleaning fluid removed through the drain or bleed valve without having to dismantle the block valves.

In the system disclosed in the aforementioned patent, the chamber formed between the two block valves comprises a T-construction with the result that the flowway defined by the chamber does not have a generally smooth, uninterrupted flowway surface which is desirable to avoid turbulent flow. Moreover, because the surface is discontinuous due to the T-construction, the chamber is more difficult to clean.

SUMMARY OF THE INVENTION

It is therefore an object of the present invention to provide an improved bleed valve assembly for use in a double block and bleed valve system.

Another object of the present invention is to provide a bleed valve assembly for use in a double block and bleed valve system wherein the flowway formed between the block valves is defined by a generally smooth, uninterrupted or unobstructed surface.

Yet another object of the present invention is to provide a bleed valve assembly for use in a double block and bleed valve system which serves the dual purpose of providing a means to introduce a cleaning solution to clean the chamber formed between the block valves and a drain to remove spent cleaning solution therefrom.

The above and other objects of the present invention will become apparent from the drawings, the description given herein and the appended claims.

The bleed valve assembly of the present invention is for use in a double block and bleed valve system having first and second block valves, e.g. butterfly valves. The assembly includes a body which is adapted to be disposed between the first and second block valves. A chamber is formed by the body between the block valve which partially defines a flowway through the body. The flowway has a generally uninterrupted, smooth flowway surface. A cavity formed in the body is in open communication with the chamber, the body further including a drain outlet which is in open communication with the cavity. A valve assembly is disposed in the cavity, the valve assembly having a rotatable valve element which can be rotated between a first, open position which permits flow through the drain outlet and a second, closed position which prevents any flow through the drain outlet. The valve assembly includes a portion which partially defines the flowway surface when the valve element is in the second or closed position so as to ensure that the flowway surface is generally uninterrupted or smooth, i.e. having no substantial discontinuities.

BRIEF DESCRIPTION OF THE DRAWINGS

FIG. 5 is an enlarged, fragmentary view, similar to FIG. 3, showing the bleed valve assembly in the clean and drain position.

FIG. 6 is a view taken along the lines 6—6 of FIG. 5.

FIG. 7 is a top planar view taken along the lines 7—7 of FIG. 5.

DESCRIPTION OF THE PREFERRED EMBODIMENT

Figure 1:
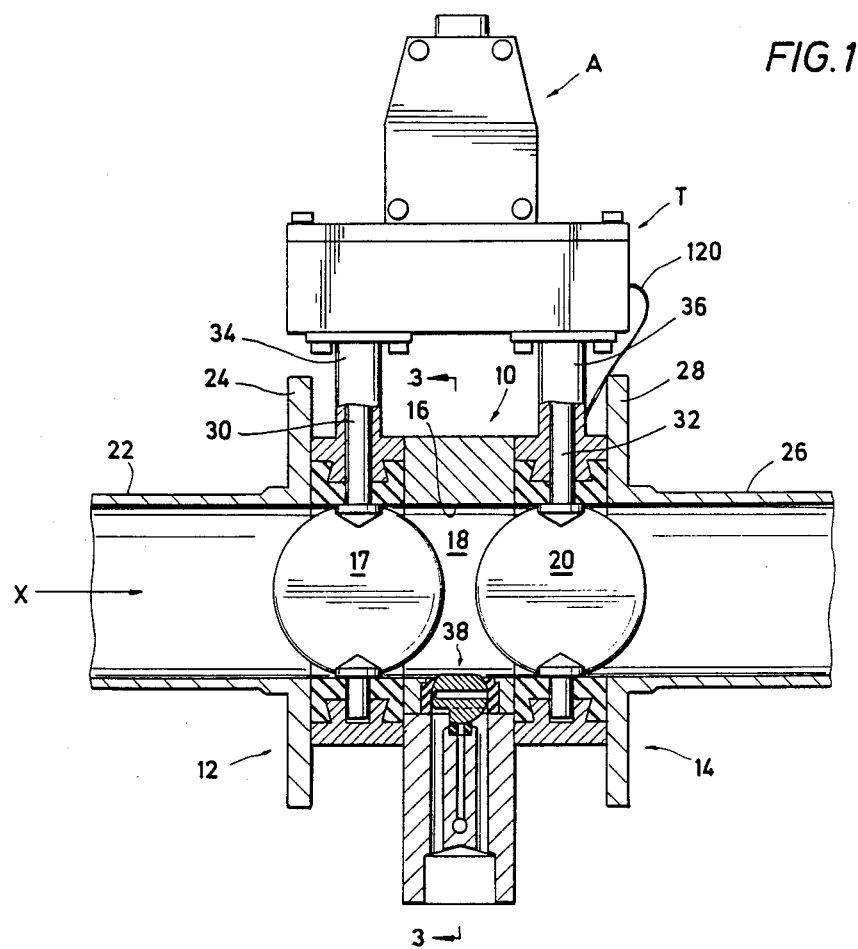
FIG. 1 is an elevational view, partly in section, showing a double block and bleed system employing one embodiment of the bleed valve assembly of the present invention.
Figure 2:
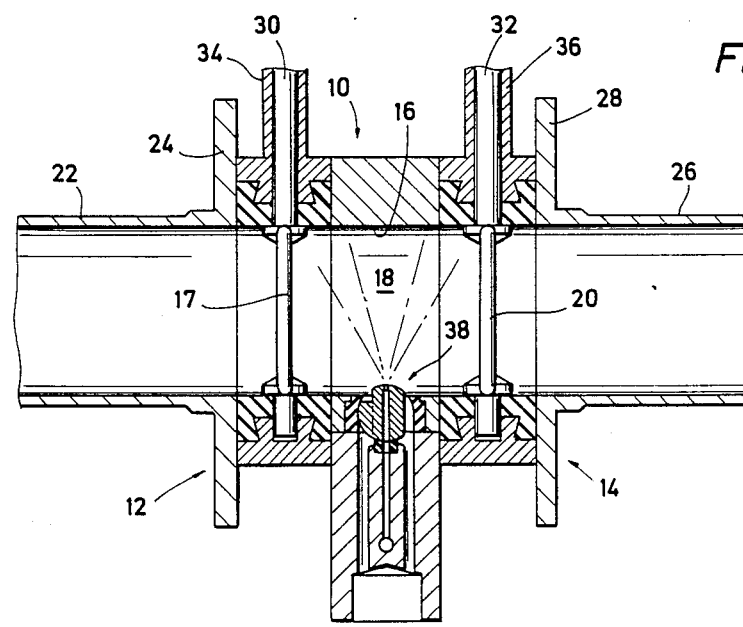
FIG. 2 is a view, similar to FIG. 1, showing a portion of the system shown in FIG. 1 with the block valve in the closed position and the bleed valve assembly in the open, i.e. the clean and drain position.

Referring first to FIG. 1, there is shown a double block and bleed system comprising a body shown generally as 10, disposed between a first block valve shown generally as 12 and a second block valve shown generally as 14. Body 10 defines a chamber 18, chamber 18 being closed when block valves 12 and 14 are in the closed position as shown in FIG. 2. As shown, block valves 12 and 14 are conventional butterfly valves having rotatable disks 17 and 20, respectively, which, as shown in FIG. 1, are in the open position. Valve 12 is connected to a pipe 22 by means of a flange connection 24, while valve 14 is connected to a pipe 26 by means of a flange connection 28. Although not shown, suitable bolts serve to connect flanges 24 and 28 and hence compress valves 12 and 14 and body 10 therebetween in sealing engagement with one another. It will thus be seen, as shown by arrow X, that with valves 12 and 14 in the open position, a liquid material can flow through pipe 22 into chamber 18 and then into pipe 26, chamber 18 thus forming a generally cylindrical flowway having a cylindrical flowway surface 16 through body 10.

Valve 12 is provided with a rotatable shaft or stem 30 attached to disk 17 for rotation therewith. Likewise, valve 14 has a rotatable shaft or stem 32 attached to disk 20 for rotation therewith. Shafts 30 and 32 extend through cylindrical neck portions 34 and 36, respectively, of valves 12 and 14, respectively.

A transmission assembly, indicated generally as T, is connected to the neck portions 34 and 36 of valves 12 and 14, respectively, transmission assembly T serving to effect rotation of shafts 30 and 32 as disclosed in co-pending U.S. application Ser. No. 246,258. Mounted on transmission assembly T is an actuator A which can be of any conventional design, such as pneumatic, hydraulic, electric, etc., actuator A serving as the driver to open and close valves 12 and 14 via transmission assembly T.

A bleed valve assembly, shown generally as 38 and described more fully hereafter, is carried by body 10 below chamber 18. In the position shown in FIG. 1, bleed valve assembly 38 is in the closed position with the result that material flowing in the direction of arrow A through chamber 18 does not escape past valve assembly 38. In the position shown in FIG. 2, with valves 12 and 14 in the closed position, the valve assembly 38 is in the open position with the result that any fluid in chamber 18 can drain through valve assembly 38 via suitable drains. Accordingly, any leakage past valves 12 or 14 can be detected. Also as shown in FIG. 2, valve assembly 38 can also be used to simultaneously spray a cleaning solution into chamber 18, the cleaning solution also draining from chamber 18 through valve assembly 38.

Referring now to FIGS. 3-7, the bleed valve assembly 38 is shown in greater detail. Body 10 is comprised of a first section 40 and a second section 42, sections 40 and 42 being secured to one another by means of bolts 44. Body section 40 defines chamber 18 and the generally cylindrical surface 16 forming the flowway through body 10. Formed in body 10 is a cavity, shown generally as 48, cavity 48 being formed by a generally cylindrical hole 50 through body section 40 and a registering recess in body section 42, valve assembly 38 being rotatably disposed in cavity 48.

Valve assembly 38 includes a rotatable valve element 49, valve element 49 having a spherical segmental surface 52 which is formed by a spherical segment. Valve element 49 also has a generally planar surface 54 formed by a base defining the spherical segment forming spherical segmental surface 52. Valve element 49 also includes a partial spherical surface 56, surface 56 being formed from the same spherical surface forming spherical segmental surface 52, surface 56 having a portion which is diametrically opposite planar surface 54. Valve element 49 is provided with diametrically opposed bores 57 and 58, bore 57 being rectangular in cross-sectional configuration whereby valve element 49 can be keyed for rotational movement to a shaft 59 extending through a bore 60 in body section 40. Bore 59 is circular in cross-sectional configuration and receives a shaft 62 which in turn is received in a bore 64 in body section 40 whereby valve element 49 can be rotated about an axis determined by shafts 58 and 62. Bore 64 is provided with a threaded outlet 66 for receipt of a lock screw to hold shaft 62 in place. It will be seen from comparing FIGS. 3 and 5, that by a 90° rotation of shaft 58, valve element 49 can be rotated from a position wherein planar surface 54 generally forms a portion of the flowway through chamber 18 (FIG. 3) and a second position wherein a portion of the spherical segmental surface 52 projects upwardly into chamber 18 (see FIG. 5).

Figure 3:
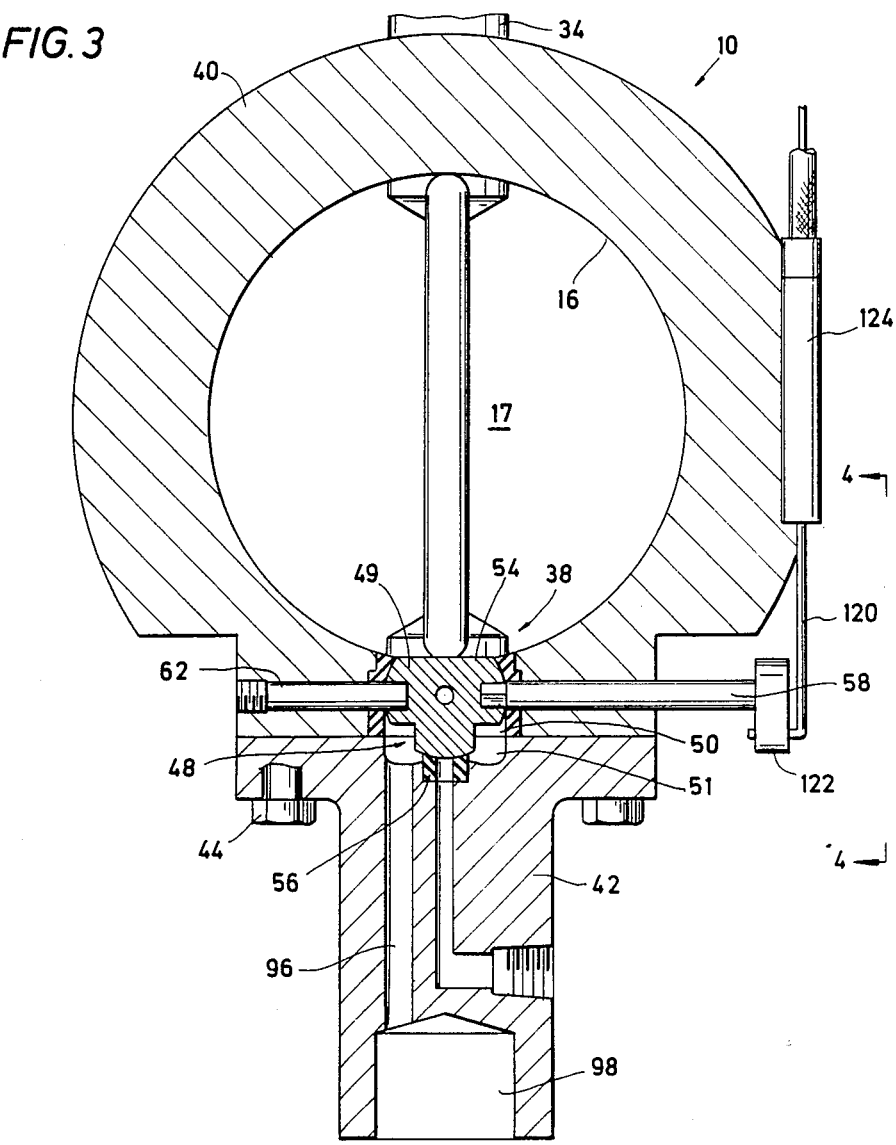
FIG. 3 is an enlarged, elevational view, partly in section, showing the bleed valve assembly used in the systems shown in FIGS. 1 and 2.
Figure 4:
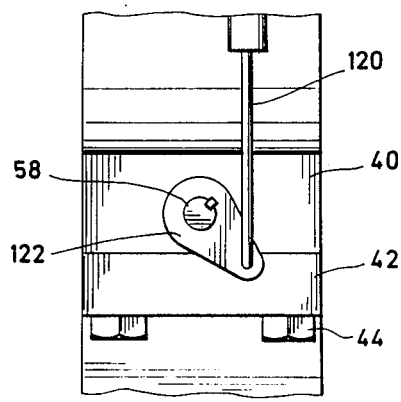
FIG. 4 is a view taken along the lines 4—4 of FIG. 3.

In order to rotate valve element 49 from the open position shown in FIG. 5 to the closed position shown in FIG. 3, and as previously indicated, shaft 58 is rotated 90°, shaft 58 being keyed to valve element 49. While this can be accomplished manually, it is more advantageously carried out in a sequenced fashion such that when the block valves 12 and 14 are moved to the closed position, valve element 49 is automatically sequenced to open. This can be accomplished by a transmission assembly T such as disclosed in the aforementioned, copending application Ser. No. 246,258. Thus, a bowden cable 120 extends from transmission assembly T and is attached to a crank 122 which in turn is keyed (see FIG. 4) to shaft 58, bowden cable 120 being secured to body 10 by means of a sleeve 124 which is secured to body section 40. Movement of the bowden cable 120 in response to the action of the transmission assembly T is translated with rotation of crank 122 and hence valve element 49.

Cavity 48 is generally cylindrical and forms a circular opening 70 into chamber 18 (see FIG. 7). Received in cavity 48 is an annular seal member 72, annular seal 72 being formed of a resilient material and having an annular lip portion 74 which is received in circular opening 70. Seal 72 also has an annular body portion 76 which is received in recess 50 of cavity 48. As best seen in FIG. 3, when valve element 49 is in the closed position, i.e. with planar surface 54 forming a part of the flowway through body 10, seal 72 forms a fluid-tight seal between body portion 40 and valve element 49 ensuring that no leakage occurs out of chamber 18 through cavity 48, i.e. when the valve element 49 is in the position shown in FIG. 3, the segmental spherical surface 52 is in sealing engagement with seal 72.

Valve element 49 has a first port 80 which opens through a first side of the spherical segmental surface 52 and a series of generally radial arrayed, second ports 82 which extend through a second, opposite side of the spherical segmental surface 52, the ports 82 and 80 being in open communication with one another to thereby provide a flow path through valve element 49 from one side of the spherical segmental surface 52 to the other side of the spherical segmental surface 52.

As best seen with reference to FIGS. 6 and 7, a series of drain passages 88, 90 and 92 are formed through valve assembly 38, drain passage 88 being formed between planar surface 54 and annular seal 72. Thus, any liquid in chamber 18 will drain through the drain passages 88, 90 and 92. The drain passages 88, 90 and 92 are in open communication with recess 51 in second body portion 42, recess 51 being in open communication with drain lines 94 and 96 formed in body portion 42. Accordingly, any liquid material in chamber 18 will pass through drain passages 88, 90 or 92, drain lines 94 and 96 and eventually out drain outlet 98 located at the lowermost end of body portion 42. Typically, a tundish or like receiver is disposed below drain outlet 98 so that it can be determined by viewing any material in the tundish whether leaking past valve assembly 38 has occurred when the valve element 49 is in the closed position shown in FIG. 3.

Received in a bore 100 formed in recess 51 is a second annular seal 102, annular seal 102 having a sealing surface 104 which is contoured to matingly seal against the spherical surface determined by partial spherical surface 56 or spherical segmental surface 52. Body portion 42 also includes a flow line 106, flow line 106 being in open communication with bore 100 which actually defines a flow line opening, a hole 108 through seal 102 being in register with flow line 106. As can also be seen, when valve element 49 is in the open position (FIGS. 5-7), flow line 106 is in open communication with port 80 and hence ports 82. Accordingly, a cleaning fluid or the like can be introduced in the flow line 106 and sprayed in a generally uniform fashion throughout chamber 18 ensuring that chamber 18 is thoroughly cleaned (see FIGS. 2 and 5). It will also be recognized that the cleaning of chamber 18 can be accomplished without the necessity of a separate spray head or the like which is permanently disposed interiorly of chamber 18 as in the prior art systems. Cleaning fluid thus introduced into chamber 18 will be continuously drained through drain outlets 88, 90 and 92 as described above. Thus, whereas in prior art systems the drain or bleed valve in the clean-in-place assembly were generally two separate components in a double block and bleed system, both functions of bleeding between the block valves and cleaning-in-place are accomplished by a single valve assembly, i.e. valve assembly 38.

Of particular importance is the fact that, in the closed position, the valve assembly 38 does not interfere with the flowway through the body, i.e. the flowway surface 16 is generally smooth and uninterrupted having essentially no discontinuities. Moreover, the valve assembly 38 eliminates the need for a separate clean-in-place spray head permanently disposed in chamber 18.

Figure 8:
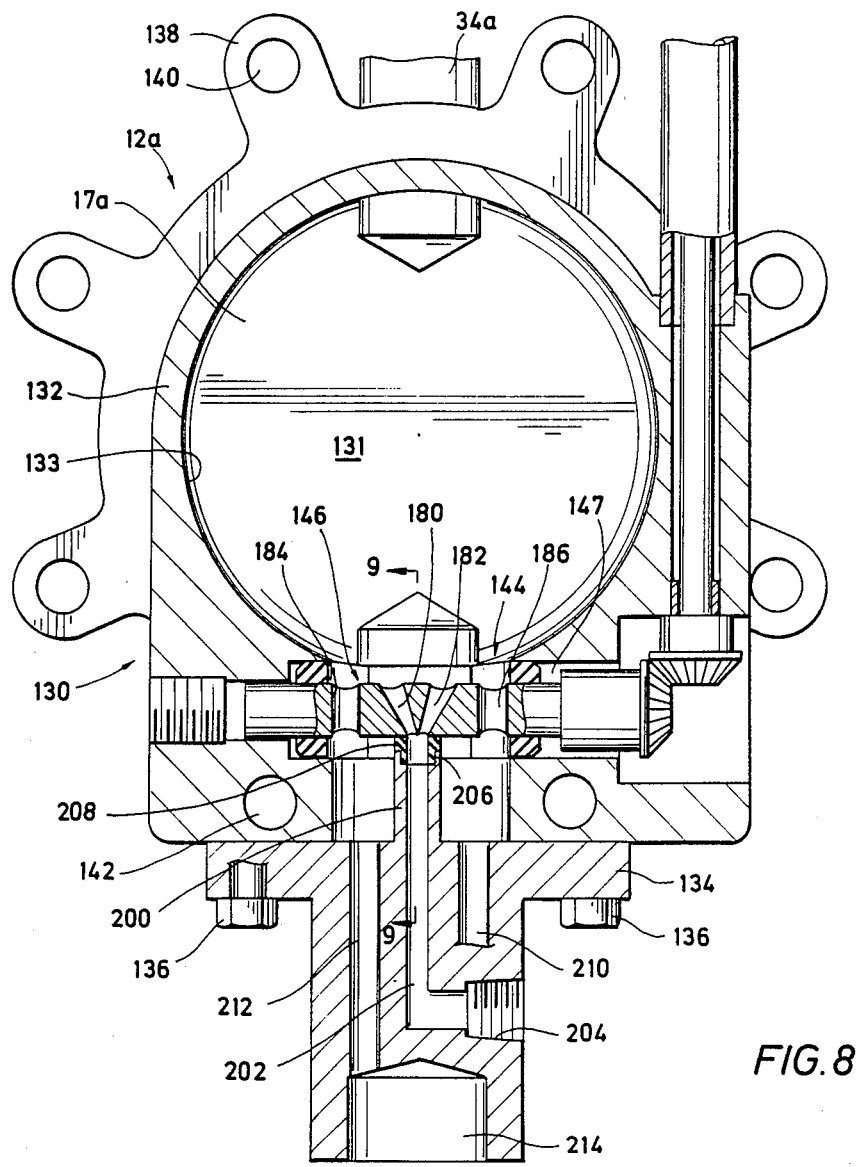
FIG. 8 is a view similar to FIG. 3 showing another embodiment of the bleed valve assembly of the present invention.
Figure 9:
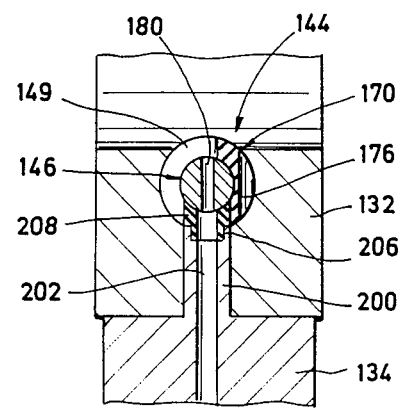
FIG. 9 is a view taken along the lines 9—9 of FIG. 8.
Figure 10:
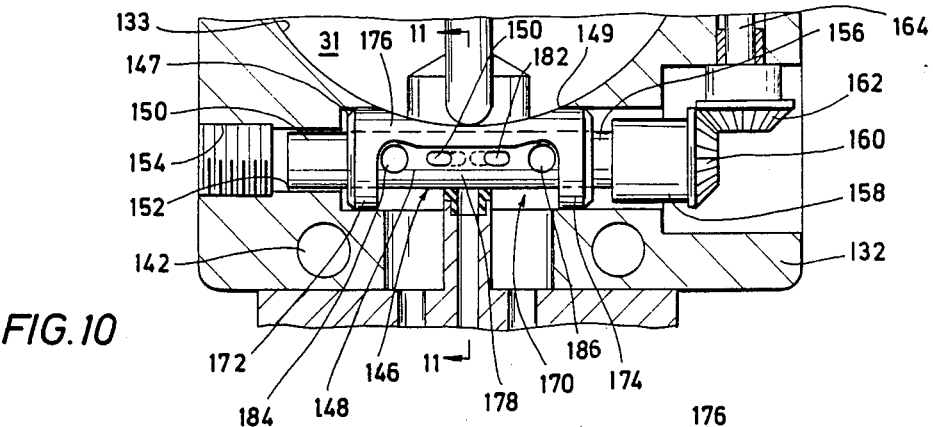
FIG. 10 is a fragmentary view of the bleed valve assembly shown in FIG. 8 with the valve element in the closed position.
Figure 11:
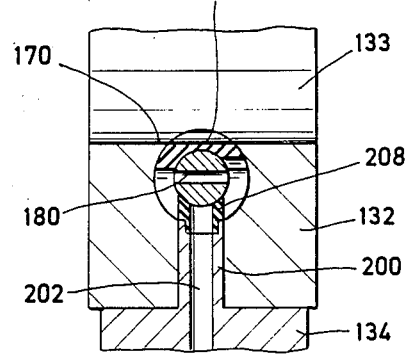
FIG. 11 is a view taken along the lines 11—11 of FIG. 10.

Referring to FIGS. 8-10, there is shown another embodiment of the bleed valve assembly of the present invention. In the embodiment shown in FIG. 8, the body, shown generally as 130, comprises a first body section 132 and a second body section 134, body sections 132 and 134 being secured to one another by bolts 136. Body 130 is disposed between the block valves in basically the same manner as shown with respect to the embodiment shown in FIGS. 1-8 and, with the block valves, forms a chamber 131. Chamber 131 forms a flowway through body 130, the flowway having a generally cylindrical flowway surface 133. The block valves shown in FIG. 8 differ slightly than valves 12 and 14 shown in FIG. 1 in that valve 12a having a rotatable disk 17a is provided with lugs 138 having bolt holes 140 whereby valve 12a and an identical valve (not shown) can be secured to one another, body 130 being compressed therebetween to form the block and bleed system. To this end, body section 132 is provided with holes 142 which are in register with holes 140 formed in lugs 138.

The valve assembly, shown generally as 144, comprises a generally cylindrical member or valve element 146 defining a generally cylindrical outer surface 148. Valve element 146 is received in a generally cylindrical cavity 147 formed in body section 132 and being disposed generally transverse to the flowway defined by cylindrical flowway surface 133. Valve element 146 has a first end 150 forming a shaft received in a first end 152 of cavity 147. A generally elipsoidal-shaped opening 149 is formed between cavity 147 and chamber 131. Cavity 152 has a threaded opening 154 for receipt of a cap screw. The second end 156 of valve element 146 is received in a sleeve 158 having a bevel gear 160. Bevel gear 160 meshes with a second bevel gear 162 which in turn is secured to a rotatable shaft 164. It will thus be seen that as shaft 164 is rotated, bevel gears 162 will likewise be rotated resulting in rotation of valve element 146, valve element 146 rotating about an axis which is lengthwise to valve element 146, i.e. through end portions 150 and 156.

Cylindrical member 148 carries a seal member, shown generally as 170, seal member 170 and valve element 146 being affixed together for mutual rotation. Seal member 170, formed of a typical sealing material, includes a first annular section 172 in surrounding relationship to valve element 146, a second, spaced annular section 174 in surrounding relationship to valve element 146 and an interconnecting web section 176. As can be seen, web section 176 together with annular sections 172 and 174, define an exposed portion 178 of the cylindrical surface 148 of valve element 146. As best seen with reference to FIG. 9, the web section 176 of seal 170 extends generally less than half the circumferential distance around valve element 146. A pair of ports 180 and 182 extend through valve element 146 forming a flow path through valve element 146, ports 180 and 182 extending through the first side of the exposed portion 178 of valve element 146 to the second side of the exposed portion 178 of valve element 146. As best seen with reference to FIGS. 8 and 10, ports 180 and 182 diverge outwardly from the first side of the exposed portion 178 of valve element 146 to the second side of the exposed portion 178 of valve element 146. Also, ports 180 and 182 have a larger opening through the second side of exposed surface 178 of valve element 146 than the opening through the first side of the exposed surface 178 of valve element 146. Thus, any fluid introduced into the ports 180 and 182 from the first side will be caused to fan out as it exits ports 180 and 182 on the second side.

Valve element 146 also includes first and second transverse slots 184 and 186, slots 184 and 186 likewise extending through valve element 146 from the first side of the exposed surface 178 to the second side of the exposed surface 178. As best seen with reference to FIG. 8, when valve element 146 is in the open position, slots 184 and 186 form drain passages from chamber 131 allowing any fluid in chamber 131 to pass through valve assembly 144.

As best seen with reference to FIG. 10, web 176 of seal member 170 has an outer surface which is contoured such that when the valve assembly 144 is in the closed position, the outer surface of web portion 176 generally conforms to the shape of the flowway surface 133 through body 130, i.e. surface 133 defining the flowway is generally smooth and uninterrupted. It can also be seen that the seal 144 effectively seals off chamber 131 from the cavity 147 so that no leakage occurs through opening 149 between cavity 147 and chamber 131. Likewise, annular seal sections 172 and 174 provide spaced, annular seals between valve element 146 and cavity 147.

Second body section 134 has a projecting cylindrical portion 200 which defines a flow line 202, flow line 202 having a flow line inlet 204. A counterbore 206 in the end of projection 200 is in register with flow line 202, an annular seal 208 having a hole 209 being received in counterbore 206, annular seal 208 having a sealing surface contoured to seal against the cylindrical outer surface 148 of valve element 146. Accordingly, when the valve assembly 44 is positioned as shown in FIG. 8, i.e. with valve element 146 in the open position, ports 180 and 182 are in register with hole 209 and flow line 202. Accordingly, a cleaning liquid or the like can be introduced through flow line 202 into ports 180 and 182, the cleaning liquid being introduced into chamber 131 so as to clean all of the surfaces defining chamber 131. Cleaning liquid thus introduced, will drain from chamber 131 through the opening 149 and drain passages 184 and 186, the cleaning fluid eventually draining through drain lines 210 and 212 formed in body portion 134, the drain lines 210 and 21 being in open communication with a drain outlet 214.

Figure 12:
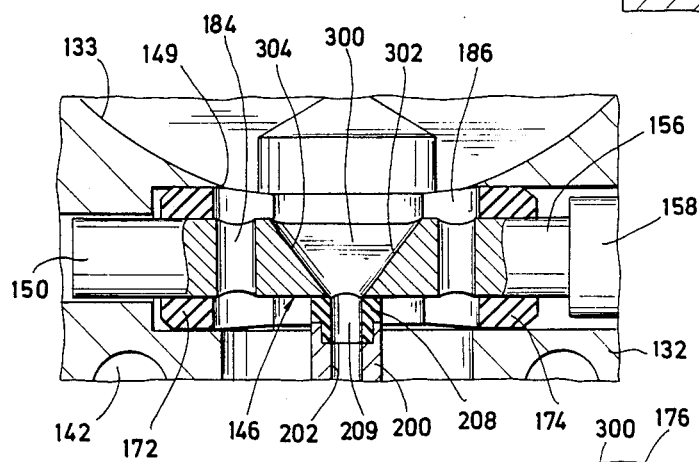
FIG. 12 is a view similar to FIG. 8 showing another embodiment of the bleed valve assembly of the present invention with the bleed valve in the clean and drain position.
Figure 13:
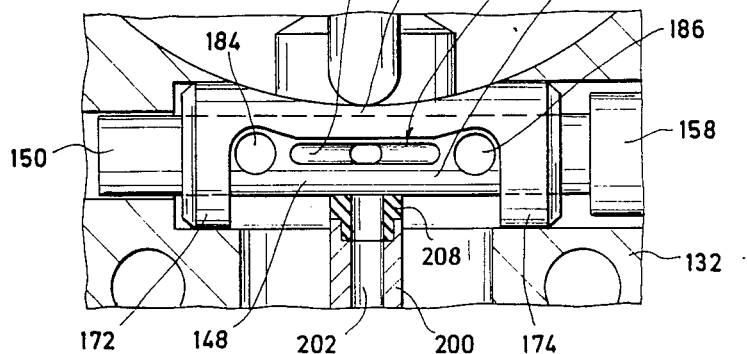
FIG. 13 is a view similar to FIG. 10 showing the bleed valve assembly of FIG. 12 in the closed position.

Referring to FIGS. 12 and 13, there is shown a slightly modified embodiment of the drain valve assembly shown in FIGS. 8-11. The valve assembly shown in FIGS. 12 and 13 is identical in all respects to that shown in FIGS. 8-11 with the exception that the flow path through the valve element 146 is comprised of a tapered slot 300 which extends through valve element 146. Tapered slot 300 has an opening 302 extending through the first side of the exposed portion 178 of the valve element 146, opening 302 being in register with flow line 202 when the valve assembly 144 is in the open position as shown in FIG. 12. Slot 300 also has an opening 304 on the second side of the exposed portion 178 of valve element 146 whereby fluid introduced through tapered slot 300 will be forced to fan out in the interior of the chamber 131 to effect cleaning of all surfaces, e.g. surface 133, defining chamber 131.

It will thus be seen that the present invention provides a bleed valve assembly for use in a double block and bleed system wherein the bleed valve assembly has a portion which partially defines the flowway surface, the flowway being substantially unobstructed, the flowway surface being generally smooth and uninterrupted, having no substantial discontinuities, and, in the preferred case, being generally cylindrical. Further, the bleed valve assembly provides a means whereby the introduction of cleaning fluid and removal of spent cleaning fluid or other liquids in the chamber between the block valves can be introduced and removed, respectively, through the same valve assembly, thereby obviating the necessity of some prior art systems which have a separate drain valve and a separate spray head to perform clean-in-place operations.

It will also be recognized that when the block valves are closed and the bleed valve assembly is in the open position, any leakage past either of the block valves will eventually flow through the drain outlet and become evident. Likewise, with the bleed valve in the closed position, leakage between the flow line through which cleaning fluid is introduced and the valve element will be apparent, any such leakage eventually passing through the drain outlet.

The foregoing disclosure and description of the invention is illustrative and explanatory thereof, and various chamber in the size, shape and materials as well as in the details of the illustrated construction may be made within the scope of the appended claims without departing from the spirit of the invention.

What is claimed is:

1. A bleed valve assembly for use in a double block and bleed valve system having first and second block valves comprising:

a body adapted to be disposed between said first and second block valves, said body forming a chamber between said first and second block valves and partially defining a flowway through said body, said body further having a cavity and a drain outlet in open communication with said cavity;

a valve assembly disposed in said cavity between said first and second block valves, said valve assembly including a valve element rotatable between a first, open position permitting drainage through said valve assembly and a second, closed position preventing drainage through said valve assembly, said valve element being profiled such that no substantial dead spaces are formed in said flowway by said valve assembly when said valve element is in said second position, a valve element opening being formed between said cavity and said chamber, a seal member being received in said valve element opening and engageable with said valve element to effect a seal between said body and said valve element when said valve element is in said second position; and means defining a drain passage through said valve assembly when said valve element is in said first position.

2. The bleed valve assembly of claim 1 wherein said valve assembly includes means to introduce a fluid material into said chamber when said valve element is in said first position.

3. The bleed valve assembly of claim 1 wherein said valve element has a first, spherical segmental surface and a second, generally planar surface, said valve element being rotatable about an axis passing generally diametrically through said spherical, segmental surface and generally parallel to said planar surface, said cavity in said body forming a generally circular opening into said chamber, said seal member comprising a first annular seal being received in said circular opening to effect a seal between said body and said first surface when said valve element is in said second position, said planar surface and said first seal defining a drain passage from said chamber and in open communication with said drain outlet when said valve element is in said first position.

4. The bleed valve assembly of claim 3 wherein said valve element has a third surface defined by a portion of a spherical surface, said third surface lying generally diametrically opposite from said generally planar surface whereby said generally planar surface and said third surface are on opposite sides of said first spherical segmental surface.

5. The bleed valve assembly of claim 4 wherein said valve element includes means defining a flow path therethrough, said flow path extending through a first side of said first spherical segmental surface and an opposed, second side of said first spherical segmental surface.

6. The bleed valve assembly of claim 5 wherein said means defining said flow path includes a first port opening through said first side of said spherical, segmental surface and a plurality of second ports in open communication with said first port and opening through said second side of said spherical segmental surface.

7. The bleed valve assembly of claim 6 wherein said body includes first and second body sections, said cavity being formed by a generally cylindrical hole in said first body section and a registering recess in said second body portion, said second body portion including a flow line having a flow line opening, a second annular seal being disposed in said flow line opening, said first port being in register with said flow line opening when said valve element is in said first position whereby a fluid may be introduced into said chamber.

8. The bleed valve assembly of claim 7 wherein said partial spherical surface is in sealing engagement with said second annular seal when said valve element is in said second position.

9. The bleed valve assembly of claim 1 wherein said valve element comprises a generally cylindrical member defining a generally cylindrical outer surface, said valve element being rotatable about an axis generally transverse to said flowway through said body.

10. The bleed valve assembly of claim 9 wherein said cavity comprises a generally cylindrical bore in said body, said cavity forming a generally ellipsoidal-shaped opening into said chamber, and wherein said seal member is carried by said valve element for rotation therewith.

11. The bleed valve assembly of claim 10 wherein said seal member includes first and second spaced, annular sections in surrounding, sealing relationship to said valve element, and an interconnecting web section, a portion of the cylindrical outer surface of said valve element defined by said first and second annular sections and said web section being exposed.

12. The bleed valve assembly of claim 11 wherein said valve element includes means defining a flow path therethrough, said flow path extending through a first side of said exposed portion of said cylindrical member and an opposed, second side of said exposed portion of said cylindrical member.

13. The bleed valve assembly of claim 11 wherein the web section of said seal member partially defines said flowway through said body when said valve element is in said second position.

14. The bleed valve assembly of claim 13 wherein said portion of said flowway defined by said web section is contoured to conform to the shape of said flowway.

15. The bleed valve assembly of claim 12 wherein said flow path comprises first and second ports extending through said cylindrical member from said first side to said second side of said exposed portion of said cylindrical member.

16. The bleed valve assembly of claim 15 wherein there are a plurality of said second ports.

17. The bleed valve assembly of claim 16 wherein there are means in said body defining a flow line, said flow line having a flow line opening in open communication with said first port when said valve element is in said first position.

18. The bleed valve assembly of claim 11 wherein said means defining said drain passage comprise at least one drain passage extending through said valve element from said first side of said exposed portion of said cylindrical member to said second side of said exposed portion of said cylindrical member.

19. The bleed valve assembly of claim 17 wherein said body comprises first and second body portions, said second body portion defining said fluid line and wherein there are annular seal means disposed in surrounding relationship to said fluid line opening.

20. The bleed valve assembly of claim 19 wherein said annular seal means is contoured to seal against said cylindrical outer surface of said valve element.

* * * * *